Oct. 23, 1956  R. C. MANINGER  2,768,370
CONTINUOUS AUTOMATIC GAS ANALYZER
Filed Oct. 30, 1952  3 Sheets-Sheet 1

INVENTOR
RALPH CARROLL MANINGER
BY
*Mitchell & Dechert*
ATTORNEYS

Oct. 23, 1956 R. C. MANINGER 2,768,370
CONTINUOUS AUTOMATIC GAS ANALYZER
Filed Oct. 30, 1952 3 Sheets-Sheet 2

INVENTOR
RALPH CARROLL MANINGER
BY
Mitchell & Beckett
ATTORNEYS

Oct. 23, 1956   R. C. MANINGER   2,768,370
CONTINUOUS AUTOMATIC GAS ANALYZER
Filed Oct. 30, 1952   3 Sheets-Sheet 3
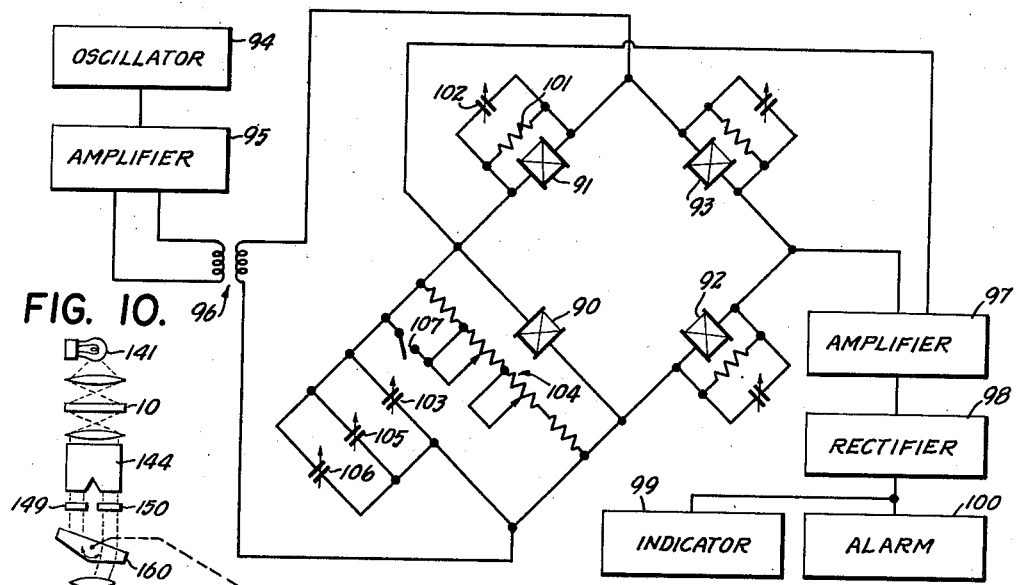
FIG. 6.
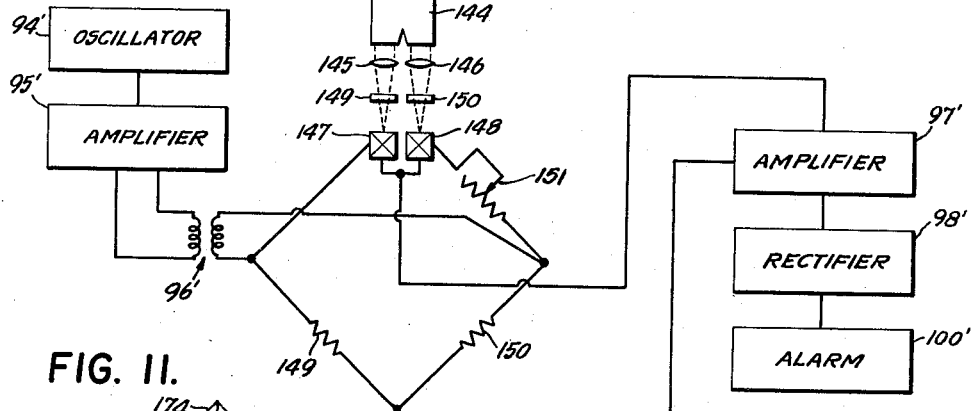
FIG. 10.
FIG. 9.
FIG. 11.
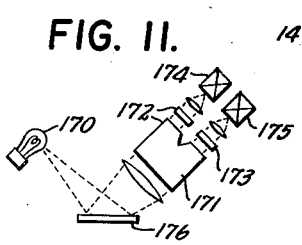
INVENTOR
RALPH CARROLL MANINGER
BY
ATTORNEYS

United States Patent Office 2,768,370
Patented Oct. 23, 1956

2,768,370

CONTINUOUS AUTOMATIC GAS ANALYZER

Ralph Carroll Maninger, Montvale, N. J., assignor to Vitro Corporation of America, New York, N. Y., a corporation of Delaware Application October 30, 1952, Serial No. 317,616

13 Claims. (Cl. 340—237)

My invention relates to means for the automatic evaluation of color, as for the detection of the relative presence or absence or predominance of a specific color component in a given spectrum. The invention is disclosed in specific application to an automatic detector of gas or other contaminants in a fluid, such as the atmosphere.

It is an object of the invention to provide an improved device of the character indicated.

It is also an object to provide improved means for continuously evaluating color concentration.

It is another object to provide an improved means for continuously evaluating the concentration of a contaminant in air or other fluid.

Another object is to provide an automatic alarm mechanism continually on the alert and adapted to set off a warning whenever the extent of contamination becomes unsafe to humans or to something which must be protected against the contaminant.

It is a further object to provide a continuous automatic analyzer of the character indicated which will be relatively insensitive to progressive saturating effects within the analyzer.

It is a specific object to meet the above objects with a device lending itself to light-weight portable construction and which is simple and relatively foolproof in operation.

It is another specific object to provide an automatic gas analyzer which will function in response to a specific color reaction between the suspected contaminant and a reagent-soaked porous member, and which incorporates automatic compensation for one or more of the following factors: drying of the porous member as a function of time, thickness variations in the porous member, non-uniform wetting of the porous member, variations in light-source intensity, and the aging of color reagents.

Other objects and various further features of novelty and invention will be pointed out or will become apparent to those skilled in the art from a reading of the following specification in conjunction with the accompanying drawings. In said drawings, which show, for illustrative purposes only, preferred forms of the invention:

Fig. 6 is an electrical circuit diagram illustrating connections to the device in Fig. 1;

Figs. 9, 10 and 11 are block diagrams schematicaly indicating electrical and optical elements of simplified alternative devices.

Figure 1:
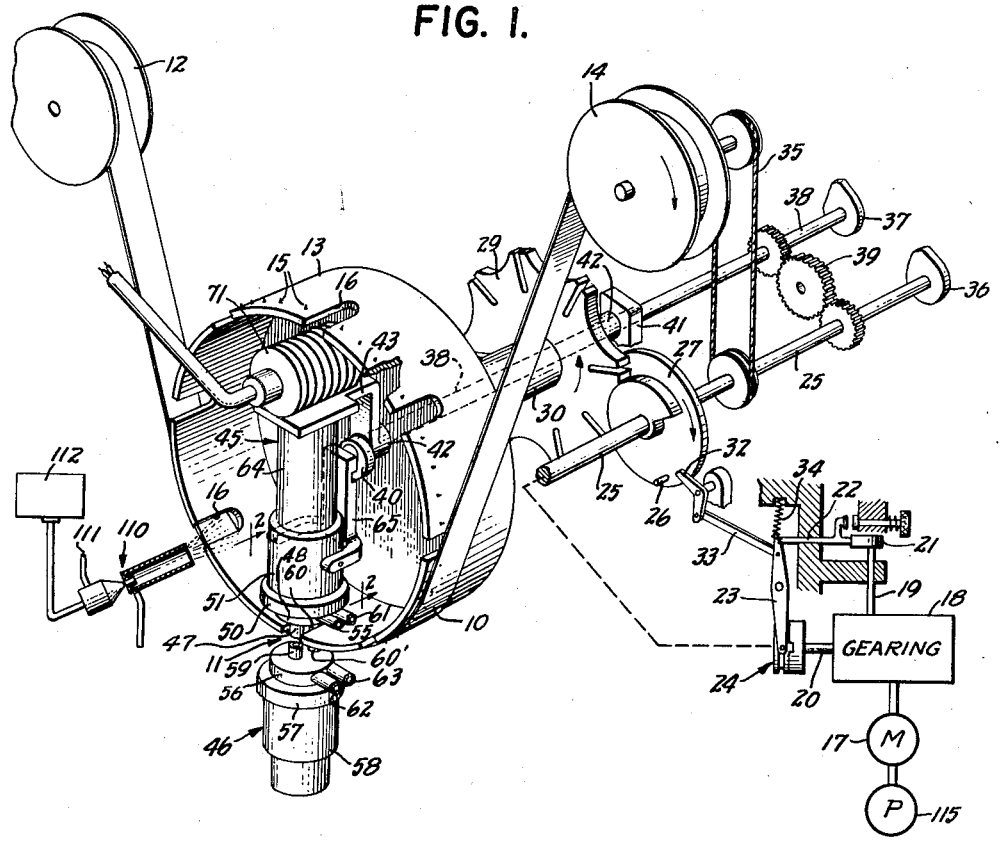
Fig. 1 is a simplified view predominantly in perspective and schematically indicating major mechanical parts of an analyzing device incorporating features of the invention.

Briefly stated, my invention contemplates color-evaluating means automatically responsive to a departure of a color-component intensity from a given value, or to a change in the instantaneous ratio between such intensity and the intensity of another component or of the entire spectrum. The basic color-evaluating means of the invention is shown in application to an improved mechanism for effectively continuously evaluating the extent of contamination of a fluid, such as air suspected of containing a noxious component. The air containing the contamination may be continuously exposed to an absorbent translucent medium, such as a section of chemically-treated paper tape wetted with a reagent having a specific color reaction with the contaminant, and continuous observations are made of the extent of color reaction. The exposed wetted section may be subjected to panchromatic light, and the light spectrum passing through this section may be split into two different spectra, one of which will exhibit a known greater change in response to the discoloration produced by the contamination than will the other. Photoelectric means may be utilized for a differential comparison or evaluation of the relative intensities of the two divided parts of the spectrum. Automatic means may be provided for assuring that the wetted medium will always be fresh enough to exhibit the desired response in terms of spectral change, and when a given section of tape has been exhausted, i. e. too dried out to exhibit the desired color reaction, these mechanisms quickly introduce a freshly wetted portion of the tape.

In one form of the invention to be described, two similarly treated portions of the reagent medium are separately exposed, on the one hand to a sample containing the suspected contamination, and on the other hand to a sample completely cleansed of any possible contamination and, therefore, constituting a reference. Light passing through the sampled and reference areas is separately treated with the above-indicated spectrum-dividing process, and any spectral changes noted in the reference treatment are utilized to provide compensating corrections in the evaluation of the spectral changes noted in the light passing through the sample. In the other form, only one spot on the tape is exposed, and the presence of contaminant is observed by noting the departure of the relative spectral changes from a known departure (i. e. a departure that is characteristic of an uncontaminated sample).

Referring to the drawings, my invention is shown in application to a continuously operating gas analyzer utilizing chemically treated flexible paper tape 10 as the vehicle for the reagent. The analyzer may include means for periodically indexing the tape 10 past an observation station 11, so that fresh reagent may be presented for observation substantially all the time, until a large reel supply of tape has been exhausted. The tape may be advanced from a supply reel 12 by means of an indexing drum 13, and the used tape may be stored upon a take-up reel 14. Both reels 12 and 14 are shown mounted above and on opposite sides of the drum 13, and pin projections or other roughness 15 on the drum 13 may assure a non-slipping drive of the tape. The drum 13 may be slotted, as at 16, at evenly spaced locations about its periphery so as to permit successive optical observations at station 11.

The drive for reel 13 may be effected by a continuously operating motor 17 through appropriate reduction gearing 18 having a relatively slow-speed output 19 and a relatively high-speed output 20. The slow-speed output 19 may have a cycle determined by the ability of the reagent to remain active at any one indexed station and, in one form in which I have embodied the invention, the cycle of output shaft 19 is about five minutes. A timing cam 21 on the output shaft 19 may thus initiate each chain of events which occurs when a fresh part of the tape 10 is advanced to the station 11. The cam 21 is shown to operate a follower 22 for moving the actuator 23 for clutch means 24 on the high-speed output shaft 20. When thus clutched, the high-speed output 20 drives a shaft 25 for operating indexing means, which is shown to include an index pin 26 carried by plate 27 and engageable with successive slots in a Geneva plate 29. The Geneva plate 29 may form a part of, or be tied by a hollow shaft 30, to the drum 13.

The indexing cycle may be completed after the pin 26 leaves a particular Geneva slot and upon the pin 26 tripping declutching means; the declutching operation may involve an arm 32 poised to intercept pin 26 and connected by link means 33 to snap the actuator 23 into a declutch position, which may be held by spring-detent means 34 until the next indexing cycle is to be initiated. In order that the tape may remain taut during indexing, I drive the take-up reel 14 directly from the shaft 25 as through a slippable belt 35. Other elements of the mechanism may also be timed or operated upon rotation of shaft 25, and I show a first cam 36 for operating a by-pass valve and a second cam 37 for operating a spray-control valve, both to be later described. The spray-control cam 37 happens to be mounted on a second shaft 38 geared 1:1 to the shaft 25, as through an idler 39, and the shaft 38 passes through the interior of the index shaft 30 for operation of an eccentric 40, also to be later described. The drum 13 may derive a fixed reference from frame means 41 immediately adjacent to the index or star wheel 29 and including a tubular projection 42, upon which the drum may be journaled, and through which the shaft 38 may rotate. The projection 42 may extend internally of the drum 13 and carry a bracket 43 for the support of optical means forming part of the invention.

Figure 2:
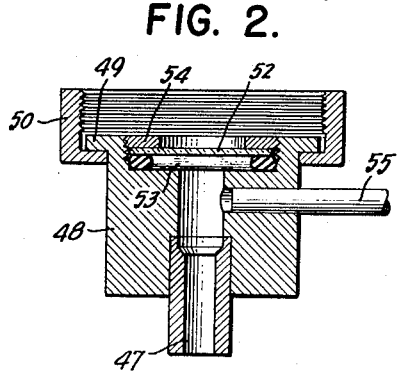
Fig. 2 is an enlarged fragmentary sectional view of an element of Fig. 1, as taken in the plane 2—2 of Fig. 1.
Figure 3:
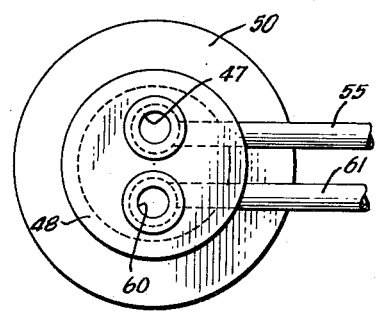
Fig. 3 is a bottom view of the parts shown in Fig. 2.

In the form shown, the optical means includes relatively fixed elements supported on opposite sides of the tape 10 and at the observation station 11. These elements comprise, generally speaking, an upper half 45 carried by the frame (bracket 43) and a lower half 46 otherwise conveniently mounted on the frame by means not shown. Taken together at the observation station 11, the elements 45—46 define a chamber when tightly fitted over opposite sides of the porous member or tape 10; thus fitted, elements 45—46 assure that fluids circulating from one chamber half to the other and through the tape will be safely confined and will not escape. Referring to Figs. 2 and 3, the upper section of the chamber may comprise a tube 47 projecting downwardly for contact with the tape 10. The tube 47 may be carried in a platen or chamber-head member 48 having a flange 49 to be removably fitted, as by means of a threaded nut 50, against the bottom edge of an optical barrel 51, vertically slidable over a fixed upper tube 64. The upper end of the chamber 47 may be closed by a transparent window 52, sealed by an O ring 53 against a counterbore in the platen 48 and secured in place by a threaded ring 54. A pipe or conduit 55 may be carried by the platen 48 and communicate with the interior of the chamber 47 to provide a means for entrance or exhaust, as the case may be, of the contaminated circulating fluid. In Fig. 3, it will be seen that I prefer that the tube or conduit 55 shall communicate with the chamber 47 off the axis thereof so as to promote a swirling or vortex action, thus assuring substantially uniform distribution of fluid across the chamber cross-section in order that optical observations may be more reliably made over an extended area.

The other half of the chamber may be formed in and carried by a lower platen or chamber-head member 56 removably held by a threaded nut 57 to a fixed lower barrel 58. As with the upper head 48, the lower head 56 may carry an upwardly projecting portion 59, and the internal construction of the head 56 may essentially duplicate that of Figs. 2 and 3. Both projections 59—47 are aligned and squeezed against the tape 10 to define the chamber.

In the form shown, I utilize the same chamber-head members 48—56 to define two like chambers, one of which (47—59) may accommodate, say, the contaminated sample, and the other of which (60—60') may similarly accommodate a reference fluid as, for example, cleansed air. In Fig. 3, the upper half 60 of the second chamber is shown to communicate with an off-axis conduit 61. Corresponding to conduits 55—61 for the upper head member 48, the lower head member 56 may carry conduits 62—63 for communication with the other ends of the same chambers as are served by conduits 55—61.

As explained above, it is preferred that the head members 56-48 shall be squeezed tightly against the tape as long as observations are being made; however, to facilitate indexing, these members must be separated or, at least, the squeeze relaxed. In the form shown, these purposes are achieved by having the lower head member 56 permanently fixed to the frame, and the member 51 vertically reciprocable, as by guided movement over the upper barrel member 64. This reciprocation may be effected upon rotation of the shaft 38 which, it will be recalled, drives an eccentric 40, one revolution for each indexing operation. Movement of eccentric 40 will lift a fork 65, pinned to the lower barrel 51, and thus sufficiently relieve the tape to permit indexing. (It will be understood that for purposes of clarity in the drawing, the lower optical half 46, including the chamber head 56, has been shown slightly below its preferred permanently fixed position; in this permanent position, the projections 59—60' will be immediately adjacent to tape 10, so that eccentric 40 may drive the upper head member 48 to squeeze the tape 10 with minimum displacement of the tape.)

Figure 5:
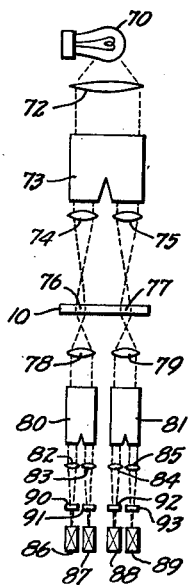
Fig. 5 is a diagram schematically indicating optical elements in the device of Fig. 1.

The optical elements may comprise a light source 70 contained within a housing 71 and carried by the bracket 43 within the drum 13. Light from source 70 may be collimated by a lens 72 (Fig. 5) contained within the barrel 64, and the collimated light may be split into two uniformly matched collimated beams by beam-splitting means 73. The beam-splitting means 73 may comprise a conventional half-silvered mirror, but in the form shown I illustrate my preference for cast truncated-cone glass or plastic prisms, which may be of the construction set forth in greater detail in my copending patent application Serial No. 314,123, filed October 10, 1952. The collimated split beams may be separately converged by matched lenses 74—75 mounted to flood spaced translucent observation areas 76—77 on the tape 10 at station 11. Therefore, between lenses 74—75 and the tape, the beams pass through the window 52 and converge, respectively, within the sampling and reference chambers (47—60) of the head member 48. Light passing through the translucent areas 76—77 may thereafter be collimated by matched collimating lenses 78—79 for passage through matched beam splitters 80—81, which may be of the same proportions but smaller dimensions than the beam splitter 73. Finally, the four beams emerging from splitters 80—81 may be converged by separate lenses 82—83—84—85 upon appropriate light-responsive means, such as photocells 86—87—88—89.

As indicated generally above, it is a feature of the invention that the responses of photocells 86—87—88—89 shall be characterized by different portions of the spectrum of light from source 70. Thus, the response of photocell 86 may be predominantly green while that of photocell 87 is predominantly red; likewise, the response of photocell 88 may be predominantly green, and that of photocell 89 predominantly red. I prefer that this be achieved by utilizing cells 86 to 89 having matched characteristics, and by placing in the split beams emanating from splitters 80—81 a desired arrangement of color filters 90—91—92—93, as, for example, green filters 90—92 and red filters 91—93.

The respective outputs of the various photo cells may be differentially evaluated by placing each of the cells in a separate arm of an A.-C. bridge circuit, as shown in Fig. 6. The bridge may be excited by oscillator and amplifier means 94—95 coupled by transformer means 96 to opposite corners of the bridge, and the bridge output may be available at the other opposite corners for observation through vacuum-tube voltmeter means, which may comprise an amplifier 97, a rectifier 98, and indicator means 99. If desired, alarm means 100 may be connected to the rectifier output and adjusted for operation at a given threshold, representing the limit of safe or desired contamination.

For compactness and ruggedness, as well as for reliable electrical performance, I prefer that the photo-electric cells shall be of cadmium-sulphide variety, as of the type disclosed in greater detail in the co-pending application of Charles Ekstein, Serial No. 277,807, filed March 21, 1952. These crystals are characterized by extremely high impedance (of the order of $10^{10}$ ohms) and, therefore, each is preferably shunted by a parallel resistance-capacitance combination (as at 101—102, for the cell 91) in order to reduce the effective impedance and to make the circuit less sensitive to stray-noise pick-up. Three of the bridge arms may be constituted as described for the arm in which cell 91 is located, but I prefer that the fourth bridge arm (containing the cell 90) shall include further adjustable elements for calibrating the circuit; thus, the capacitance 103 and the overall value of resistances 104 may correspond to the combination 101—102 for cell 91; but capacitances 105—106 may provide coarse and fine adjustments, and resistance 104 may also include provision for coarse and fine adjustment. A short-circuiting switch 107 may, when desired, introduce a substantial disturbance in the alignment of the bridge in order to produce a predetermined reading on the indicator 99. If actuation of switch 107 fails to produce the expected indicator reading, then one may know that the circuit is not properly calibrated and that adjustment should be made until the proper reading is produced for operation of switch 107.

Mechanically speaking, operation of the described device is as follows. First, the tape is wetted, as by means of an aspirating spray head 110 arranged to direct water or other droplets on the tape 10 at the index station just ahead of the observing station 11. The sprayer 110 may operate upon application of a pressurized supply of clean air at inlet 111, to draw upon fluid contained in a reservoir 112; the fluid in reservoir 112 may include a reagent, having a specific color response to the suspected contaminant. This spray action will be produced automatically by the spray-control cam 37 operating a shut-off valve 113, once for every indexing of the machine. Immediately after spraying, and during the same indexing cycle of the machine, the eccentric means 40 will be effective to relieve the platen heads 48—56 from the tape 10, so that the drum 13 may be indexed and the newly wetted portion of tape 10 placed in alignment with the optical axes. The platens will close as the eccentric 40 completes its cycle, and, if necessary, the electric circuits may be quickly adjusted for the calibration, as at 104—105—106. Thereafter, both the contaminated-sample and the cleansed-reference gases are independently supplied to and drawn from the platen heads (by means described below) throughout the remainder of the cycle of operation, and the electrical circuits continuously indicate, record, or otherwise function in accordance with the instantaneous differential observation of the color-shift relationships.

Figure 4:
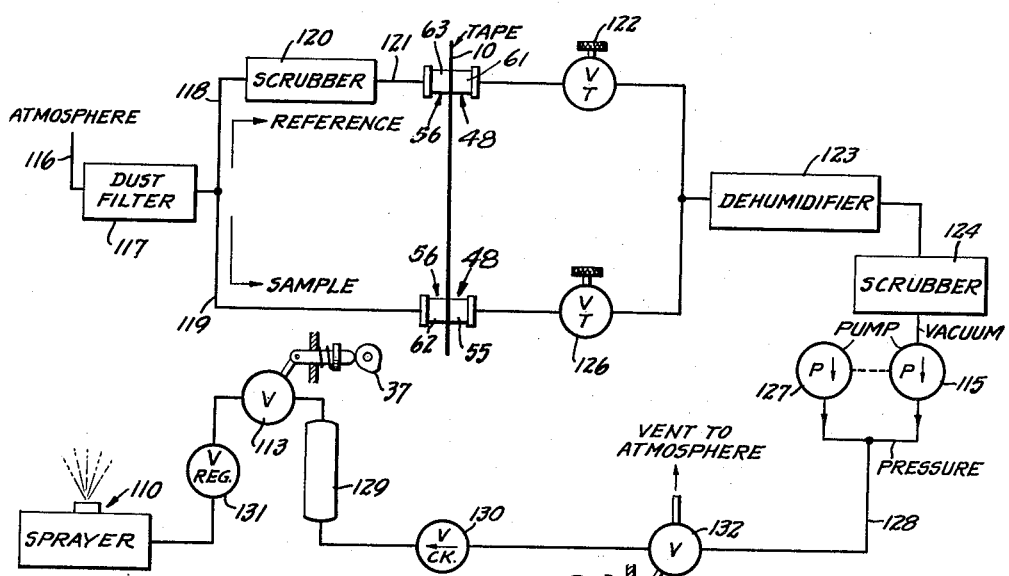
Fig. 4 is a fluid-flow diagram schematically indicating elements of the device of Fig. 1.

In Fig. 4, the contaminated and reference fluids are shown to be continuously passed through the platen heads by pressurizing means including a vacuum pump 115 which may be driven by the motor 17 (Fig. 1). Both the contaminated and cleansed fluids may be available from the same inlet 116 open to the atmosphere and, if desired, a dust filter 117 may remove particles having no relation to the contamination. After filtering at 117, the inlet line may be divided into a reference line 118 and into a sampling or contamination line 119. A scrubber 120 may remove contaminants in the reference line 118, so as to provide cleansed air or other inlet fluid in line 121 for connection, as through flexible tubing, to the lower reference inlet 63 of the platen 56. After passing through the reference chamber (including spot 77 on the tape 10), the cleansed air may be drawn out of the upper reference outlet 61 and to the pump means 115 through a throttle valve 122, dehumidifier means 123, and another scrubber 124.

Similarly, the contaminated line 119 may be connected, as through flexible tubing, to the inlet 62 for the other chamber in the lower platen 56. After passing through spot 76 in tape 10 and out conduit 55, the used contaminated sample may be passed through the same dehumidifier and scrubber 123—124 as described above; and a second throttle valve 126 may provide means for adjusting the flow in line 119 to bear a desired relationship to the flow in line 121.

To assure a plentiful supply of compressed air for the spraying means 110, I show a second pump 127, which may also be driven by the motor 17, for pressurizing a line 128 to the sprayer 110. The line 128 is shown to charge an accumulator 129 through check-valve means 130, and in order that pumping transients shall not affect the uniform operation of the sprayer 110, I not only include a regulating valve 131 in the supply line to the sprayer, but also provide a by-pass valve 132 to disconnect the pumps from the sprayer whenever the sprayer is operated. This disconnection is accomplished by having valve 132 vent the pumps to the atmosphere upon actuation by the cam 36, which will be recalled as operating once for each indexing of the machine.

Figure 7:
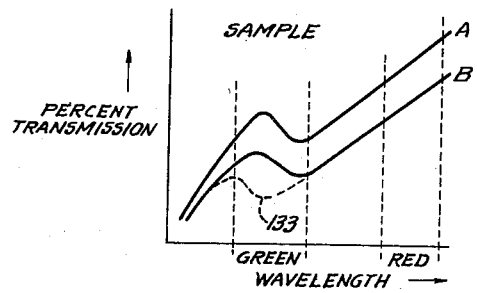
Figs. 7 and 8 are curves graphically indicating various light responses illustrative of operation of the device of Fig. 1.
Figure 8:
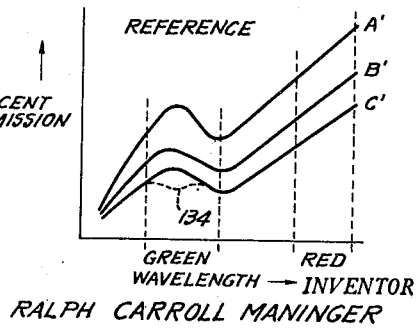

Referring to Figs. 7 and 8, the optical operation will be seen to depend upon a specific color reaction between the expected contaminant and the wetted reagent on the tape. For most contaminants, a specific reagent may be found which will exhibit an ascertainable unbalanced or asymmetrical spectral shift in the presence of the specific contamination. Thus, for the case of hydrogen sulphide as the contaminant, a particular asymmetrical color shift occurs when lead acetate is used as the reagent on the paper tape; the tape may be impregnated with the reagent prior to wetting, or the wetting solution may contain the reagent, as will be understood. At the beginning of any prolonged period of exposure of spots 76—77 to the sample and to the reference, respectively, the light transmitted through these translucent areas may have exactly matched spectral characteristics, as indicated by the matched curves labelled A—A' in the sample curve of Fig. 7 and in the reference curve of Fig. 8, respectively. The electrical bridge may be balanced under these conditions, for the impedance of the arm including cell 86 (representing the green response in the sample spot 76 in line 119) will be equal to the impedance in the conjugate arm including cell 88 (representing the green response in the reference spot 77 in line 121); similarly, the red response in the conjugate arms containing cells 87 and 89 will determine equal impedances in these arms.

If there is no contamination in the sample appearing in line 119 and, therefore, passing through spot 76, the action will be merely to evaporate the moisture in the wetted spots 76—77 so as to reduce the ability of the translucent areas to transmit light. Thus, after the lapse of a given period of time, both spots 76—77 may transmit in accordance with the characteristics B—B' of Figs. 7 and 8. Of course, the impedances of the bridge arms will have changed because the percent transmission of the translucent spots is reduced; but, since the spectral shifts are symmetrical, the impedance-ratio relationships in conjugate arms will remain the same, and the electrical bridge will stay in balance. If, on the other hand, contamination has been present in the sample appearing in line 119, an asymmetrical spectral shift will occur in the expected part of this spectrum, as in the green segment indicated generally by the dotted lobe 133 of the curve B. Of course, the lobe 133 will occur only for the spectrum transmitted by the contaminated spot 76, so that the cell 86 (representing green response of the contaminated spot) may exhibit a substantially different impedance from that of the corresponding cell 88 for the reference spot 77. This impedance difference will throw the bridge out of balance so as to produce a meter reading at 99, and if the extent of bridge unbalance exceeds the selected threshold of safety, the alarm 100 may operate automatically.

The drying rate of the two spots 76—77 need not be the same. Suppose that the reference spot 77 should dry more rapidly than the contaminated or sample spot 76, so that the reference transmission curve is represented by the curve C' (Fig. 8) at the instant when the sample transmission characteristic is indicated by the curve B (Fig. 7). Under these conditions, the impedance of the bridge arm including cell 89 (red part of the reference spectrum) will have increased more rapidly than that of the bridge arm including cell 87 (red part of the sample spectrum), thus tending to unbalance the circuit. However, this tendency to unbalance will have been offset by the fact that the impedance of the bridge arm including the cell 88 (green part of the reference characteristic) will have increased more rapidly than that of the arm including cell 86 (green part of the sample spectrum) by a proportionate amount, so that balance is maintained.

Under certain circumstances, it may be possible for both spots 76—77 on the tape to change color for some reason or other than the presence of the contaminant being detected. When this occurs, a small droop may appear in the green portion of the reference transmission spectrum, as at 134 in the curve C'. It is most unlikely that both spots will have been affected other than identically under these conditions. Therefore, both the impedance of the arm including cell 88 and impedance of the arm including cell 86 will change by the same amount, and balance will still be maintained, or at least the extent of bridge unbalance will not be adversely affected by the unexpected spectrum shift common to both spots. Thus, the bridge automatically compensates for what may be termed blank-color formation, and if such color formation is not excessive, it will not impair the ability of the instrument to detect the presence of a gas or other contaminant.

In Fig. 9, I show a simplified modification which may utilize the same tape-transporting mechanism as described above. The essential difference between the simplified arrangement of Fig. 9 and the device already described lies in the utilization of a single spot 140 (rather than two spots 76—77) for color evaluation. The spot 140 may first be wetted as previously described and then subjected only to gas containing the suspected contaminant, as by exposure to line 119. Light from a source 141 may be focused by lens 142 so as to flood the area of spot 140, and a collimating lens 143 may convert light transmitted through the translucent spot 140, for passage to a beam splitter 144. The split beams may be focused by lenses 145—146 upon cells 147—148, by way of filters 149—150 appropriate to the detection of the suspected contaminant in the presence of a given reagent. The cells 147—148 may be connected in conjugate arms of an A.-C. bridge resembling that described in Fig. 6 except that fixed impedances 149—150 constitute the other conjugate arms of the bridge; trimming means, suggested at 151, may provide means for initially balancing the bridge.

In operation, as long as the sampling line 119 contains no contaminant, the average intensity of light passing the red filter 150 will always bear a given relationship to the average intensity of light passed by the green filter 149. This will be true more or less regardless of drying as a function of time; but if contaminant should react with the paper reagent to produce a droop or asymmetrical shift in the spectral curve, as at 133, then this intensity relationship will no longer be the same, and the electrical bridge may serve as a ratio-monitoring device to observe departure of the cell-impedance ratio from that value which represents no contamination. If this departure should exceed a preselected threshold of tolerable contamination, then alarm means 100' may operate as in Fig. 6.

In Fig. 10, I illustrate that our basic color-evaluating or gas-analyzing method is not necessarily limited to twin-cell arrangements or to steady-state observation of a given color. The means of Fig. 10 may be completely analogous to that described in Fig. 9, except that a single cell is subjected to the incoming light in an alternating succession involving examination of one limited spectrum and then another. This alternation may be accomplished with a single light beam and a continuously rotating color wheel involving the alternate placement of different filters in a light beam, but Fig. 10 shows the employment of beam-shifting means 160 to cause a single cell 161 to take alternate "looks" at the beams separately passing through filters 149—150. The beam-shifting means may be a continuously rotating prism successively converging alternate filtered beams on cell 161, but in the drawing I suggest that element 160 is a prism angularly oscillated (by means not shown) to provide preferably equal time-sharing in the projection of alternate beams on cell 161. The cell 161 may constitute (or be included in) one arm of a bridge circuit having fixed impedances 162—163—164 in the other arms, and signal-processing means 165 may provide an output characterized by an alternating succession of amplitudes representing bridge unbalance for the color components in the respective beams; the intensity difference characterizing this alternating succession (i. e., ripple amplitude) may be observed for attainment of the alarm or other threshold. Alternatively, the signal-processing means 165 may be understood to include commutator or switching means synchronized with oscillation of prism 160 (as suggested by the dotted line 166), so that signals attributable to color-component intensities in the two beams may be segregated into two separate electrical channels, if desired and as will be understood.

Although specifically described in application to the observation of a spectrum shift occurring in a translucent sample, it will be appreciated that the basic nature of my color-evaluating means has broader implications. For example, as far as the color-evaluation means itself is concerned, it does not matter whether the colored light, which is to be evaluated, is received directly from a colored light source (as, for example, a colored lamp), or through a translucent specimen (as specifically described herein), or by reflection from the specimen (as schematically suggested in Fig. 11). In Fig. 11, light emanating from source 170 may be panchromatic, monochromatic, or otherwise limited, depending upon the specific application requirements; and the color-evaluating means including beam splitter 171, filters 172—173 and cells 174—175 may observe the color or color shift in light reflected off the specimen or surface 176, in a manner analogous to that described for the splitter 144 and cells 147—148 in Fig. 9.

In the broad sense, my basic color-evaluating means will be seen to rely principally on transducer means that is differentially responsive to two different wave lengths or wave bands subjected to the same treatment (e. g., reflected from or passed through a specimen). In the sense contemplated in Figs. 1 to 9, the transducer means comprises basically the beam splitter and two cells or other light-responsive means having different characteristic spectral responses. In the sense illustrated in Fig.

10, the differential transducer means will be understood to comprise the sampling optics 160 and the single cell 161, together with the signal-processing circuitry.

Aside from the basic color-evaluating method, it will be seen that I have described a basically simple and highly sensitive device for automatically monitoring air or other atmosphere or fluid for the presence of a specific contamination, which may be a gas toxic to humans. The described device can detect extremely low concentrations which, in the case of hydrogen sulphide in air, may be as low as 0.005 part per million. The device may be fitted with tape sufficient to last a 24-hour period of automatic operation, and continuous sampling and monitoring may only be interrupted for short times and at infrequent intervals, in effect to freshen or reactivate the observation areas. Both the described forms of the invention feature automatic or inherent compensation for drying of the tape spots as a function of time, for variations in tape thickness, for unequal initial wetting of the spot, and for light-source intensity variations (as caused by line-voltage fluctuations); the two-spot system of Figs. 1–8 further compensates for aging of color reagents in the tape or for fluctuations in reagent concentration in the wetting fluid, depending upon the method used for introducing the reagent.

While I have described my invention in detail for the preferred forms shown, it will be understood that modifications may be made within the scope of the invention as defined in the claims which follow.

I claim:

1. In a device of the character indicated, means for supporting two translucent specimens in spaced relation, common means for bathing both specimens with the same light, and separate light-responsive means separately responsive to light passing through said specimens, one of said light-responsive means having a predominant spectral response different from that of the other, one of said spectral responses being specific to a color component to be monitored in one of said specimens, the other of said spectral responses being substantially independent of said component, and means for differentially observing the respective responses of said light-responsive means.

2. In a device of the character indicated, a source of light, means for splitting light from said source into two separate beams, means for introducing separate specimens in the paths of said beams, light-filtering means having different passbands and separately exposed to light emanating from said specimens, one of said passbands being specific to a color component to be monitored in one specimen, the other of said passbands being substantially independent of said component, and separate light-responsive means separately responsive to the filtered light, whereby one of said light-responsive means may provide a reference factor for corrective interpretation of the output of the other of said light-responsive means.

3. In a device of the character indicated, a source of light, means for exposing a specimen to light from said source, beam-splitting means responsive to light emanating from said specimen, two light-responsive means separately responsive to the beams of said beam-splitting means, one of said light-responsive means having a different predominant spectral response from that of the other, one of said spectral responses being specific to a color component to be monitored in said specimen, the other of said spectral responses being substantially independent of said component, and means for differentially observing the respective responses of said light-responsive means to light from said beams.

4. In a device of the character indicated, a source of light, means for exposing two separate translucent specimens separately to light from said source, two beam-splitting means separately responsive to light passing through said respective specimens, two light-responsive means for the respective beams emanating from each of said beam-splitting means, there being associated with each beam-splitting means a first light-responsive means having a given first spectral response and a second light-responsive means having a given and different second spectral response, means for differentially observing the respective responses to light from one of said beam-splitting means, means for differentially observing the respective responses to light from the other of said beam-splitting means, and means for combining the differential observations.

5. In a device of the character indicated, a source of light, means for separately exposing two different translucent specimens to light from said source, separate beam-splitting means for light passing through each of said specimens, separate photoelectric cells responsive to all split beams, filtering means having a passband more restricted than the response of said cells and disposed in one of the beams of each of said beam-splitting means, and an electric-bridge circuit including in each of four arms thereof a separate one of said photo cells.

6. In a device of the character indicated, a source of light, means for exposing a translucent specimen to light from said source, beam-splitting means responsive to light passing through said specimen, two separate photoelectric cells responsive separately to the split beams, filtering means in the path of light impinging upon one of said cells, whereby the spectral responses of said cells are different, and means including a bridge circuit including said cells in separate arms thereof for differentially combining the outputs of said cells.

7. In a device of the character indicated, a moistened absorbent translucent reagent medium, means for exposing said medium to light and to a gas having a known color reaction with said medium, beam-splitting means responsive to light passing through said medium, first and second light-responsive means for the respective beams of said beam-splitting means, said respective light-responsive means having different spectral responses, one of which is specific to said color reaction and the other of which is substantially independent thereof, whereby the output of one of said light-responsive means may provide a reference factor for corrective interpretation of the output of the other of said light-responsive means.

8. In a device of the character indicated, fluid-conducting means including an inlet and a division into two independent lines, cleansing means in one of said lines, whereby cleansed fluid in one of said lines may constitute a reference and fluid in the other of said lines may constitute an unknown sample, a translucent reagent medium, having a specific color reaction to a suspected contaminant in said sample, means for separately applying the outputs of said lines to separate parts of said medium, means for uniformly subjecting to light the parts of said medium that are subjected to the sample and to the reference respectively, two spectrum-dividing means separately exposed to light passing through the said parts subjected to the sample and to the reference respectively, each of said spectrum-dividing means being substantially alike and dividing light into beams of substantially different predominant wavelength, four photoelectric cells separately responsive to the four separate beams of said spectrum-dividing means, and a bridge circuit separately including said cells in each of said four arms thereof.

9. A device according to claim 8, and including vacuum-inducing means exposed to said medium on the side opposite each of said lines, whereby the sample and the reference may be continuously drawn through said medium.

10. A device according to claim 8, in which said fluid is a gas and in which means are provided for wetting said medium in the areas exposed to said sample and said reference.

11. Color-evaluating means, comprising a differential light-responsive transducer including inlet means responsive to a single beam of light, beam-splitting means for dividing said beam into two paths, filtering means in one of said paths for producing different color-absorption characteristics in one of said paths from that in the other of said paths; the respective responses of said paths after filtering being such, for a particular specimen in said beam and for a particular suspected contamination thereof, that the suspected contamination will change the spectral response in one path substantially to the exclusion of the other path; and means differentially responsive to the respective intensities of light in said beams for differentially evaluating the relative intensities of such light.

12. Color-evaluating means, comprising a differential light-responsive transducer, including inlet means responsive to a single beam of light, a single light-responsive cell, filtering means, means effectively intermittently interposing said filtering means between said cell and light from said beam, whereby said cell is subjected to alternate exposure with and without said filtering means, and signal-processing means responsive to the output of said cell and differentially evaluating the responses to said alternate exposures.

13. Color-evaluating means, comprising head means including two independent internal chambers each having an inlet and an outlet, aligned spaced transparent means on opposite sides of each of said chambers, means subjecting the transparent means for both said chambers to light from a common source, first and second beam-splitting means respectively responsive to light passing through said transparent means of both said chambers and therefore to any coloration due to fluid contained within said chambers, each beam-splitting means including first and second color filters having different spectral responses and in the respective split beams, the respective responses of said filters being so selected for such fluid and for particular suspected contamination thereof that the spectral response for one filter occurs in a wavelength region for which the suspected contamination will produce a change in absorption and such that the spectral response for the other filter occurs in a wavelength region for which the suspected contamination will produce substantially no change in absorption, said first filters for said first and second beam-splitting means having substantially the same spectral response and said second filters having substantially the same spectral response, means evaluating the relative intensity of the filtered beams of said first filters, and means evaluating the relative intensity of the filtered beams of said second filters; whereby, with one of said chambers subjected to a reference fluid and the other to a contaminated fluid, one of said evaluating means may provide a reference factor for corrective interpretation of the output of the other of said evaluating means.

References Cited in the file of this patent

UNITED STATES PATENTS

| | | |
|---|---|---|
| Re. 23,023 | Wolf et al. | Aug. 3, 1948 |
| 1,711,742 | Nordlander | May 7, 1929 |
| 2,232,622 | Moses et al. | Feb. 18, 1941 |
| 2,386,878 | Nickerson | Oct. 16, 1945 |
| 2,395,489 | Major et al. | Feb. 26, 1946 |
| 2,519,081 | Skarstrom | Aug. 15, 1950 |
| 2,547,212 | Jamison et al. | Apr. 3, 1951 |
| 2,617,940 | Giguere | Nov. 11, 1952 |
| 2,639,418 | Sundstrom et al. | May 19, 1953 |